(12) United States Patent
Nigul (10) Patent No.: US 11,907,313 B2
(45) Date of Patent: Feb. 20, 2024

(54) RECOMMENDING RECIPES USING TIME-HORIZON BASED USER INGREDIENT POOL

(71) Applicant: Maplebear Inc., San Francisco, CA (US)

(72) Inventor: Leho Nigul, Aurora (CA)

(73) Assignee: Maplebear Inc., San Francisco, CA (US)

( * ) Notice: Subject to any disclaimer, the term of this patent is extended or adjusted under 35 U.S.C. 154(b) by 377 days.

(21) Appl. No.: 17/142,038

(22) Filed: Jan. 5, 2021

(65) Prior Publication Data

US 2022/0215061 A1 Jul. 7, 2022

(51) Int. Cl.
*G06F 16/9535* (2019.01)
*G06N 20/00* (2019.01)
*G06F 16/9538* (2019.01)
*G06F 16/2457* (2019.01)

(52) U.S. Cl.
CPC .... *G06F 16/9535* (2019.01); *G06F 16/24578* (2019.01); *G06F 16/9538* (2019.01); *G06N 20/00* (2019.01)

(58) Field of Classification Search
CPC .......... G06F 16/24578; G06F 16/951; G06F 16/9535; G06F 16/9536; G06F 16/9538; G06F 16/953; G06F 16/9532; G06N 20/00
See application file for complete search history.

(56) References Cited

U.S. PATENT DOCUMENTS

| | | | |
|---|---|---|---|
| 11,144,957 B1* | 10/2021 | Raak | G06Q 30/0631 |
| 2008/0300993 A1* | 12/2008 | Rozenblatt | G06Q 30/06 705/16 |
| 2014/0095479 A1* | 4/2014 | Chang | G06Q 30/0631 707/E17.005 |
| 2014/0172894 A1* | 6/2014 | Argue | G06Q 30/02 707/758 |
| 2017/0293964 A1* | 10/2017 | Xie | F21V 3/02 |
| 2017/0316489 A1* | 11/2017 | Sampara | G06Q 30/0631 |
| 2019/0164117 A1* | 5/2019 | Wallace | H04L 12/2829 |
| 2020/0301973 A1* | 9/2020 | Sewani | G06F 16/9035 |
| 2020/0302377 A1* | 9/2020 | Danducci | G06N 20/00 |

* cited by examiner

Primary Examiner — Kris E Mackes
(74) Attorney, Agent, or Firm — Fenwick & West LLP (57) ABSTRACT

An online recommendation system can choose recipes to recommend to a customer based on a set of ingredients the customer is inferred to have on hand (a customer pantry model). For example, the recommendation system can look at recent or historical purchases made by the customer and determine what items the customer still has available based on an assumed shelf life for the purchased items. Using the customer pantry model, the recommendation system selects recipes based on overlapping ingredients between recipe's ingredient lists and ingredients available to the customer (including the customer pantry model and their current shopping cart). In some implementations, the recommendation system first selects a set of candidate recipes based on the overlap, then selects the final set of recipes to recommend based on a score optimization (for example, performed using a machine learning model).

20 Claims, 8 Drawing Sheets

RECOMMENDING RECIPES USING TIME-HORIZON BASED USER INGREDIENT POOL

BACKGROUND

This disclosure relates generally to recommending recipes to users. More particularly, the disclosure relates to selecting recipes to recommend to users based on a user's ability to make the recipe with available ingredients.

In current online systems and mobile applications, a customer creates an order of items to be purchased from a retailer. To facilitate the customer's shopping experience, the online system or mobile application may present items in an online catalog of items available at a retailer to the customer, who may select items to add to the order. In some cases, a customer may select items based on a specific recipe they are planning to make or otherwise have a definite plan of what items they need to purchase. In other cases, a customer may be unsure of which items to buy (for example, if they don't have a specific recipe in mind) and may select only staple items or make a few purchases intending to figure out what to make later. This can lead to situations where customers end up improvising recipes due to lack of suitable ingredients (which may have mixed results) or where a customer needs to make several additional purchases to buy missing ingredients that they could have included in their original order.

SUMMARY

In various embodiments of the invention, a recommendation system chooses recipes to recommend to a customer based on a set of ingredients the customer is inferred to have on hand (e.g., using a customer pantry model). For example, the recommendation system looks at recent or historical purchases made by the customer and determines what items the customer still has available based on an assumed shelf life for the purchased items. Using the customer pantry model, the recommendation system selects recipes based on overlapping ingredients between recipe's ingredient lists and ingredients available to the customer (including the customer pantry model and their current shopping cart). In some implementations, the recommendation system first selects a set of candidate recipes based on the overlap, then selects the final set of recipes to recommend based on a score optimization (for example, performed using a machine learning model). The recommended recipes are then presented to the customer through a dedicated user interface or alongside other content (such as within a user interface the customer is using to shop for items).

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Environment of a Recipe Recommendation System

Figure 1:
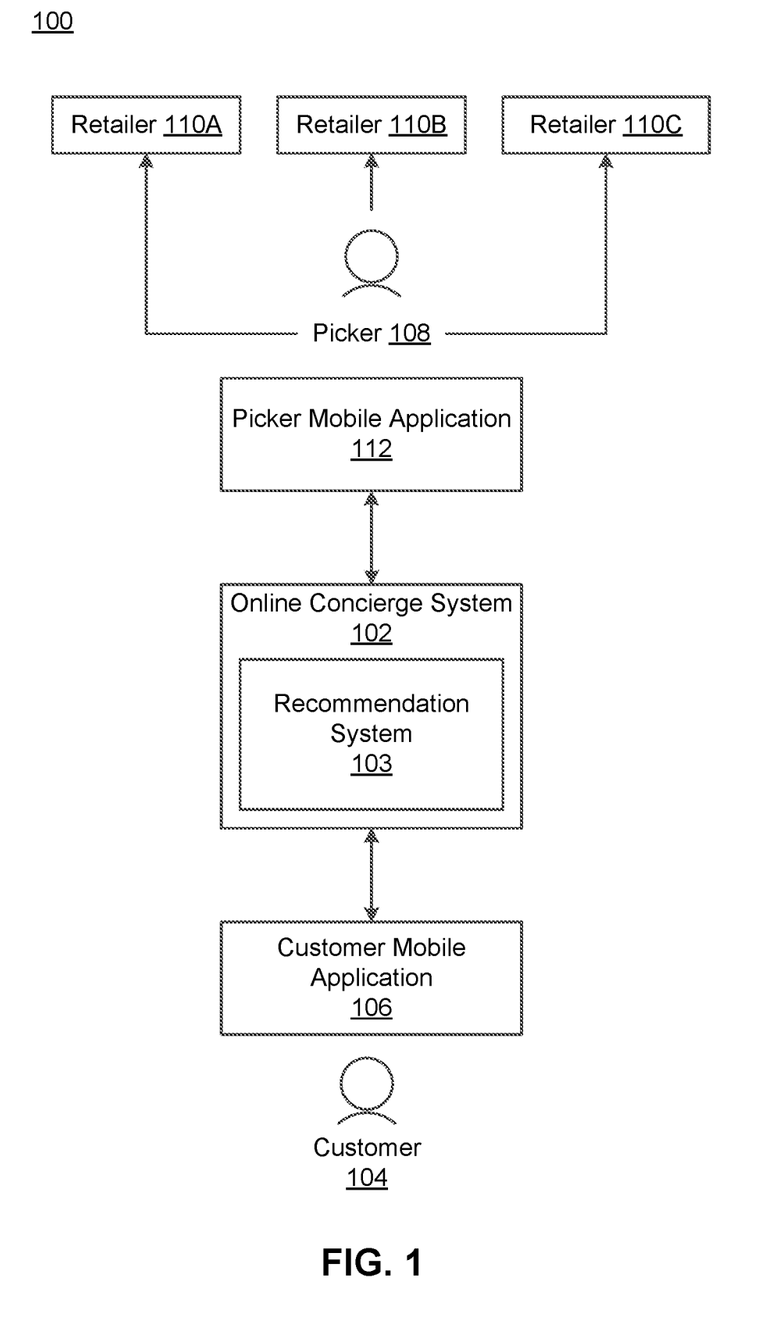
FIG. 1 illustrates the environment of an online concierge system with a recipe recommendation system, according to one embodiment.

FIG. 1 illustrates the environment 100 of an online concierge system 102 including a recommendation system 103, according to one embodiment. The environment 100 of FIG. 1 includes an online concierge system 102 with a recommendation system 103, a customer 104 using a customer mobile application 106, a picker 108 using a picker mobile application 112, and several retailers 110A, 110B, and 110C. The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral. For example, "110" in the text refers to reference numerals "110A," "110B," and/or "110C" in the figures.

In the environment 100, the online concierge system 102 is configured to receive orders from one or more customers 104 (FIG. 1 shows only one customer 104 for the sake of simplicity). A customer 104 can be a user of the online concierge system 102 able to place orders with the online concierge service 102. In some implementations, an order specifies a list of goods (items or products) to be delivered to the customer 104. An order can also specify the location to which the goods are to be delivered, and a time window during which the goods should be delivered. In some embodiments, the order specifies one or more retailers from which the selected items should be purchased. A customer 104 can the use customer mobile application (CMA) 106 to place the order; the CMA 106 is configured to communicate with the online concierge system 102.

The online concierge system 102 can include a recommendation system 103 which can suggest one or more items for a customer 104's order. Recommendations can be selected based on characteristics of the customer 104, based on current contents of the customer 104's order, based on historical information about the customer 104, or the like. In some implementations, the online concierge system allows customers to purchase food items and ingredients, and the recommendation system 103 can suggest recipes for the customer 104 to make. Recipe recommendations can be made through a user interface of the customer mobile application 106 as a customer 104 is browsing or shopping for items using the online concierge system 102, based on a specific request for a recommendation by the customer 104 through their customer mobile application 106, or based on any other factor (for example, recipe recommendations can be emailed to customers 104 or presented through other sources, depending on the implementation). Recipe recommendations to customers 104 can include suggestions of items needed to prepare the recipes based on a model of the customer 104's available items (for example, by suggesting missing ingredients needed to make the recipe but that the customer 104 does not have on hand). In other implementations, a recommendation system 103 can be incorporated into other types of system (other than an online concierge system 102), for example a standalone website or other interface.

The online concierge system 102 can be further configured to transmit orders received from customers 104 to one or more pickers 108. A picker 108 may be a contractor, employee, or other person (or entity) who is enabled to fulfill orders received by the online concierge system 102. The environment 100 also includes three retailers 110A, 110B, and 110C (only three are shown for the sake of simplicity; the environment could include hundreds of retailers). The retailers 110 may be physical retailers, such as grocery stores, discount stores, department stores, etc., or non-public warehouses storing items that can be collected and delivered to customers 104. The retailers may also be referred to as warehouse locations. Each picker 108 fulfills an order received from the online concierge system 102 at one or more retailers 110, delivers the order to the customer 104, or performs both fulfillment and delivery. In one embodiment, pickers 108 make use of a picker mobile application 112 which is configured to interact with the online concierge system 102.

Online Concierge System

Figure 2:
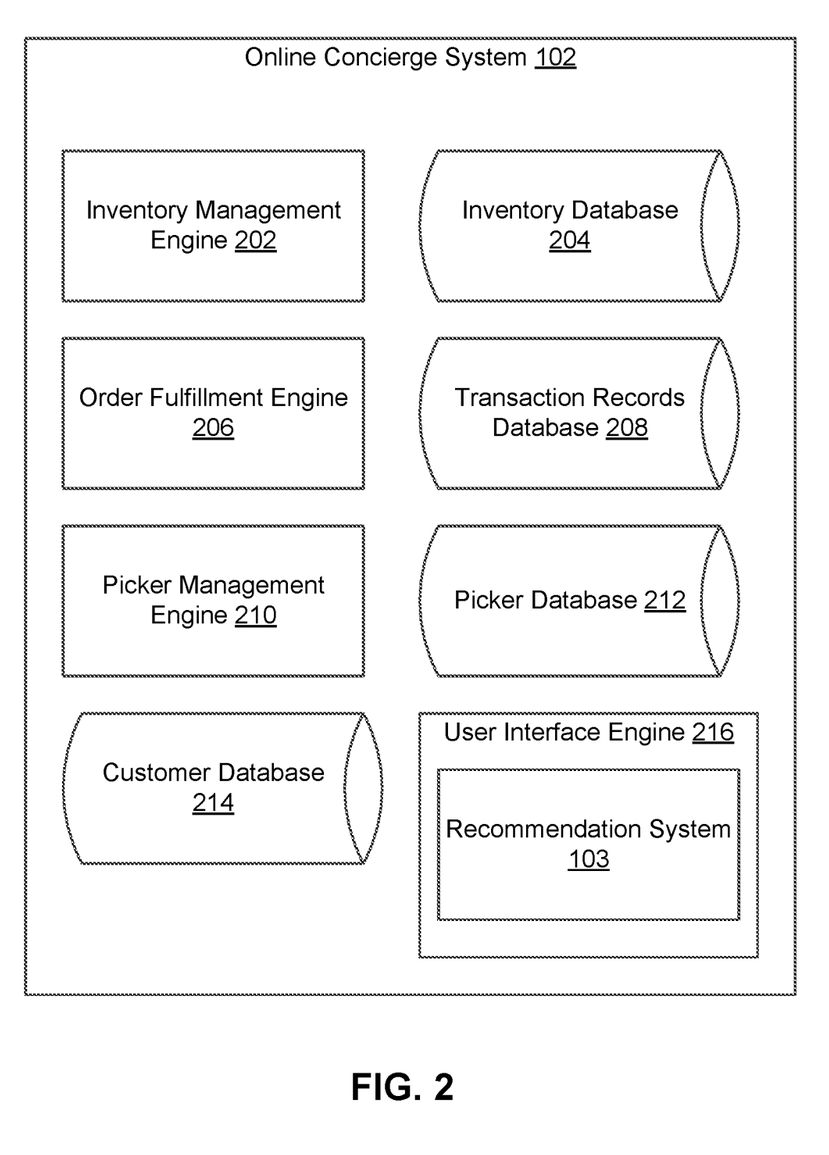
FIG. 2 is a block diagram of an online concierge system, according to one embodiment.

FIG. 2 is a block diagram of an online concierge system 102, according to one embodiment. The online concierge system 102 includes an inventory management engine 202, which interacts with inventory systems associated with retailers 110. In one embodiment, the inventory management engine 202 requests and receives inventory information maintained by the retailer 110. The inventory of each retailer 110 is unique and may change over time. The inventory management engine 202 monitors changes in inventory for each participating retailer 110. The inventory management engine 202 is also configured to store inventory records in an inventory database 204. The inventory database 204 may store information in separate records—one for each participating retailer 110—or may consolidate or combine inventory information into a unified record. Inventory information stored in the inventory database 204 can include both qualitative and qualitative information about items available through the online concierge system 102, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204.

The online concierge system 102 also includes an order fulfillment engine 206 which is configured to manage orders made by customers 104 (for example, via the customer mobile application 106). The order fulfillment engine 206 is also configured to access the inventory database 204 in order to determine which products are available at which retailers 110 and can determine a sale price for each item ordered by a customer 104. Prices set by the order fulfillment engine 206 may or may not be identical to in-store prices determined by retailers 110 (which is the price that customers 104 and pickers 108 would pay at retailers). The order fulfillment engine 206 also facilitates transactions associated with each order. In one embodiment, the order fulfillment engine 206 charges a payment instrument associated with a customer 104 when he/she places an order and may transmit payment information to an external payment gateway or payment processor. The order fulfillment engine 206 stores payment and transactional information associated with each order in a transaction records database 208. For example, a record of an order stored in the transaction records database 208 can include information about the contents, date, and price of the order, for example an identification of a customer 104 placing the order and the picker 108 filling the order, a list of items included in the order (and corresponding prices), a total price of the order, information about the retailer(s) where the items were sourced from, and dates that the order was placed and fulfilled.

In some embodiments, the order fulfillment engine 206 also shares order details with retailers 110 associated with the order. For example, after successful fulfillment of an order, the order fulfillment engine 206 may transmit a summary of the order to the appropriate retailer(s) 110. The summary may indicate the items purchased, the total value of the items, and in some cases, an identity of the picker 108 and customer 104 associated with the transaction. In one embodiment, the order fulfillment engine 206 pushes transaction and/or order details asynchronously to systems of retailers 110. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a picker management engine 210, which manages communication with and utilization of pickers 108. In one embodiment, the picker management engine 210 receives a new order from the order fulfillment engine 206. The picker management engine 210 identifies the appropriate retailer 110 to fulfill the order based on one or more parameters, such as the contents of the order, the inventory of the retailers 110, and the proximity to the delivery location. The picker management engine 210 then identifies one or more appropriate pickers 108 to fulfill the order based on one or more parameters, such as the picker's proximity to the appropriate retailer 110 (and/or to the customer 104), his/her familiarity level with that particular retailer 110, and so on. Additionally, the picker management engine 210 accesses a picker database 212 which stores information describing each picker 108, such as his/her name, gender, rating, previous shopping history, and so on. The picker management engine 210 transmits the list of items in the order to the picker 108 via the picker mobile application 112. The picker database 212 may also store data describing the sequence in which the pickers 108 picked the items in their assigned orders.

As part of fulfilling an order, the order fulfillment engine 206 and/or picker management engine 210 may access a customer database 214 which stores information describing each customer 104. This information could include each customer's name, address, gender, shopping preferences, favorite items, stored payment instruments, and so on.

To facilitate communication between customers 104 and pickers 108, the online concierge system 102 can include a user interface engine 216 that can generate content for display in user interfaces of the customer mobile application 106 or the picker mobile application 112. The user interface engine 216 can also send additional information via customer mobile application 106 or picker mobile application 112, such as in the form of messages, texts, emails, or push notifications. In some implementations, the user interface engine 216 includes the recommendation system 103 and can generate recommendations for insertion into user interfaces for customers 104. For example, the user interface engine 216 can generate an ordering user interface for display on the customer mobile application 106 allowing a user to browse, select, and change items to be included in an order. The recommendation system 103 can generate one or more recommendations of recipes and items to be included in the recommendation system 103. The user interface engine 216 will be discussed further in relation to FIG. 4.

Figure 3A:
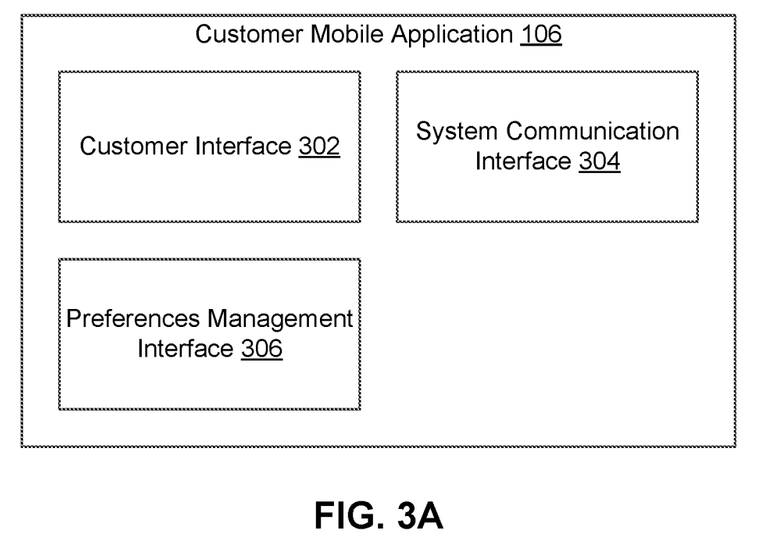
FIG. 3A is a block diagram of the customer mobile application (CMA), according to one embodiment.

FIG. 3A is a block diagram of the customer mobile application (CMA) 106, according to one embodiment. A customer 104 can access the CMA 106 using a client device such as a mobile phone, tablet, laptop, or desktop computer. The CMA 106 may be accessed through an app running on the client device or through a website accessed in a browser. The client device associated with the CMA 106 can be connected to the online concierge system 102 through one or more networks (such as the internet) using wired, wireless, or mobile data technologies. In some embodiments, the CMA 106 includes a customer interface 302, which provides an interactive user interface through which a customer 104 can browse through and select products, place an order, view recommendations from the recommendation system 103. As described above, the user interface module 216 can control content that appears in the customer interface 302 of a CMA 106 and can send user interface information content, layout, or other information to the CMA 106 for display to the customer 104.

The CMA 106 can include a system communication interface 304 which, among other functions can receive inventory information and user interface content from the online concierge system 102 and transmits order information or other customer selections (for example, made via the customer interface 302) to the online concierge system 102. The CMA 106 also includes a preferences management interface 306, which allows the customer 104 to manage basic information associated with his/her account, such as his/her home address and payment instruments. The preferences management interface 306 may also allow the user to manage other details such as his/her favorite or preferred retailers 110, preferred delivery times, special instructions for delivery, and so on.

Figure 3B:
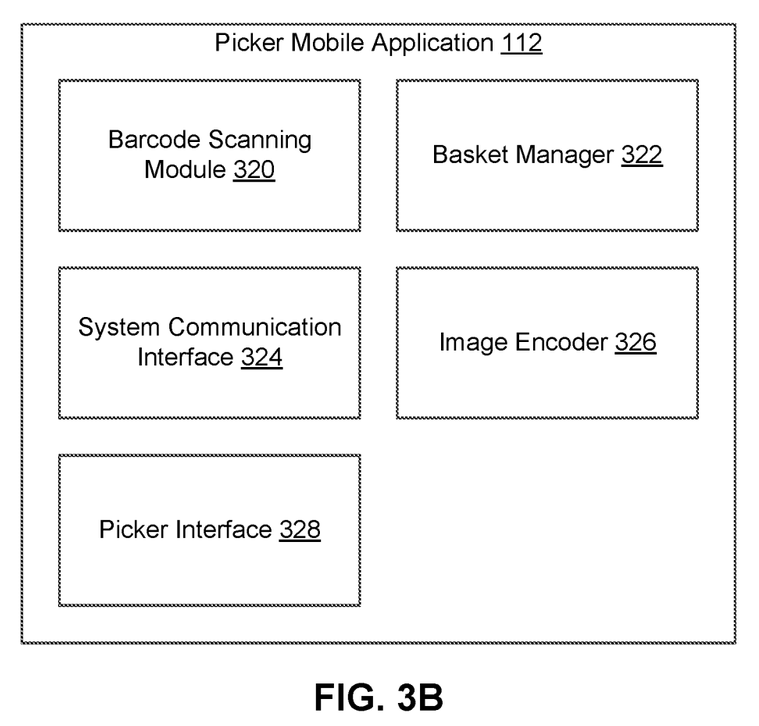
FIG. 3B is a block diagram of the picker mobile application (PMA), according to one embodiment.

FIG. 3B is a block diagram of the picker mobile application (PMA) 112, according to one embodiment. A picker 108 can access the PMA 112 via a mobile client device, such as a mobile phone or tablet. The PMA 112 may be accessed through an app running on the mobile client device or through a website accessed in a browser. The client device associated with the CMA 106 can be connected to the online concierge system 102 through one or more networks (such as the internet) using wired, wireless, or mobile data technologies. In some implementations, the PMA 112 includes a barcode scanning module 320 which allows a picker 108 to scan an item at a retailer 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. The PMA 112 can also include a basket manager 322 which maintains a running record of items collected by the picker 108 for purchase at a retailer 110. This running record of items is commonly known as a "basket." In one embodiment, the barcode scanning module 320 transmits information describing each item (such as its cost, quantity, weight, etc.) to the basket manager 322, which updates its basket accordingly. The PMA 112 also includes an image encoder 326 which encodes the contents of a basket into an image. For example, the image encoder 326 may encode a basket of goods (with an identification of each item) into a QR code which can then be scanned by an employee of the retailer 110 at check-out.

The PMA 112 also includes a system communication interface 324, which interacts with the online concierge system 102. For example, the system communication interface 324 receives information from the online concierge system 102 about the items of an order, such as when a customer 104 updates an order to include more or fewer items. The system communication interface may receive notifications and messages from the online concierge system 102 indicating information about an order or communications from a customer 104. The system communication interface 324 may send this information to a picker interface 328, which generates a picker user interface to display the received information to the picker 108. In some embodiments, the picker interface 328 is an interactive interface through which pickers 108 may interact with customers 104 and the online concierge service 102 and receive notifications regarding the status of orders they are assigned. For example, pickers 108 may view their orders through the picker interface 328 and indicate when there is an issue with an item in an order, such as the item being out of stock or of poor quality.

Figure 4:
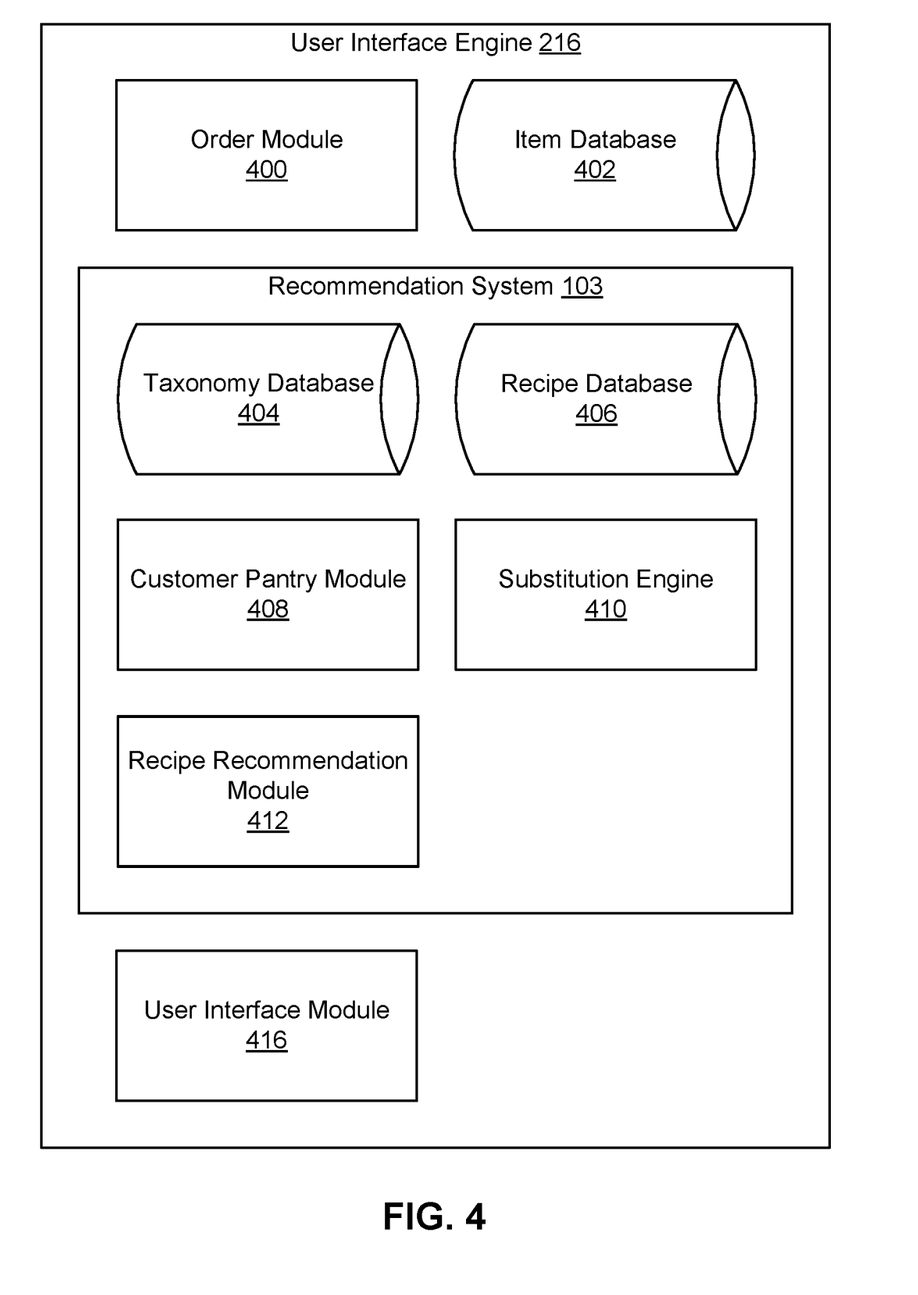
FIG. 4 is a block diagram of a user interface engine including a recommendation system, according to one embodiment.

FIG. 4 is a block diagram of a user interface engine including a recommendation system, according to one embodiment. In the embodiment of FIG. 4, the user interface engine 216 includes an order module 400, an item database 402, the recommendation system 103, and a user interface module 416. The recommendation system 103 of FIG. 4 includes a taxonomy database 404, a recipe database 406, a customer pantry module 408, a substitution engine 410, and a recipe recommendation module 410. In some embodiments, the order interface engine 216 has more or different components than those shown in FIG. 4. In other embodiments, the components shown in FIG. 4 may be combined or removed.

The order module 400, in some embodiments, manages and responds to interactions from customer 104 when browsing through or otherwise interacting with items of the online concierge system 102. For example, the order module 400 maintains a current order for a customer 104 including a list of items (for example, a virtual "shopping cart") and receives and responds to queries for items to add to the order and otherwise allow customers 104 to manage the contents of and place orders. For example, the order module 400 responds to user queries or searches for specific items or categories of items, respond to user requests to add or remove items from an order, or the like.

The item database 402 contains items stored at a plurality of warehouse or retail locations from which customers 104 can place orders. The item database 402 may be an index of items stored by location and/or items stored by matching queries previously received by the online concierge system 102. The item database 402 may further include information related to each item, such a brand, type, size, and other identifying characteristics (such as a SKU or UPC code) of an item. For example, the item database 402 can contain an entry for Moo Moo brand milk, which is associated with the brand "Moo Moo," the types "organic" and "lactose-free," the size "1 gallon," and one or more locations the item is available at. Each item in the item database 402 can also be associated with one or more categories of the taxonomy database 404 that specific item falls into. The item database 402 may also include sale information for the items indicating price of each item by size and/or type and a number of orders in which an item was contained.

In some implementations, the order module 400 selects a set of applicable items in response to a query received from a customer 104 (such as from the CMA 106 running on a customer's 104 client device) or other sources. Queries can include a word or string of text entered by a customer 104 to search the online concierge system 102 for an item. For example, a customer 104 may enter the query "butter" via the customer ordering interface when looking for butter on the online concierge system 102. Queries may also include text indicating brand, type, quantity, and other descriptive information about one or more items. In another example, the customer 104 may enter "yummy butter" or "organic butter" when querying the online concierge system 102. These queries indicate that the customer 104 is looking for a particular brand (e.g., "Yummy") or type (e.g. "organic") of butter. In some implementations, the order module 400 queries the item database 402 to determine the results of a customer 104's query.

In some implementations, the order module 400 retrieves a set of items matching the customer 104's query that are also associated with one or more warehouse locations designated by the customer 104. The order module 400 may perform a text search for items in the item database 402 that match text of the query or may match the query with a previous query stored in the item database 402 in relation to one or more items. In some embodiments, the order module 400 finds items for warehouse locations located within a geographic range from the customer's 104 address (for example, an address associated with his/her account) or other location designated by the customer 104. In other embodiments, the order module 400 finds items for a specific warehouse location entered by the customer 104 via the customer interface 302. For instance, the order module 400 may retrieve, for the query "butter" and the warehouse location "Grocery 365: Mountain View location," the items "Yummy butter," "Moo Moo Organic butter," and "Dairy-free Veggie butter" from the item database 402. After determining the set of items matching a customer 104's query, the order module 400 can update the user's order responsive to the query or send the set of items matching the query to the user interface module 416 (for example, for display for the user).

As described above, the recommendation system 103 can suggest one or more recipes or items to customers 104. In some implementations, the recommendation system 103 suggests recipes for a customer 104 to make using ingredients they have on hand (or are included in a current order of the customer 104). Recipe recommendations to customers 104 may include suggestions of items needed to prepare recipes based on a model of the customer 104's available items (for example, by suggesting missing items needed to prepare the recipe but that the customer 104 does not have on hand). Though the recommendation system 103 is explained in the context of generating recommendations when a customer 104 assembling an order at an online concierge system 102, this is just one example environment in which a recommendation system 103 can be used. The recommendation system 103 may be used in other systems to generate recommendations for recipes or other objects requiring a list of items based on an available item pool for a customer 104 or other entity. Other embodiments may use an online system, mobile application, or any other system in which a customer is associated with a plurality of items. Similarly, a recommendation system 103 may be used outside the context of a user assembling an order and instead be displayed to a customer 104 (or user) on a standalone page, website, or application.

The taxonomy database 404 stores a taxonomy that maps items to item categories describing items with shared characteristics. For example, the taxonomy database 404 can map the item "Moo Moo Organic butter" to the item category "butter." In some implementations, the taxonomy database 404 is organized as a hierarchical structure of item categories. For instance, the product category "butter" may be a leaf category of the predefined taxonomy branching from the product categories "dairy products" and "spreads," which each branch from the product category "foods." As used herein, a "leaf category" refers to the most specific item category of the hierarchical taxonomy, so leaf categories do not have other item categories branching from them. For example, an item category "milk" can have the leaf categories of "whole" and "2%" branching off from it (and the "milk" category can itself be branching from other item categories such as "dairy products").

Each category of the taxonomy database 404 can be associated with a "category identifier" (such as a unique name or identification code) that can be used by other aspects of the online concierge system 102 to reference items within that category of the taxonomy database 404. In the taxonomy, an item associated with a leaf category is also considered to be associated with each higher-level category the leaf category is a part of. As described above, items in the item database 402 can also be associated with one or more categories of the taxonomy database 404. For example, Moo Moo brand milk can be associated with taxonomy categories of "2% milk" and "milk." In the embodiment of FIG. 4, the taxonomy database 404 is separate from the item database 402 and the inventory database 204, but in alternative implementations, the taxonomy database 404, inventory database 204, and/or the item database 402 are combined. For example, the item records from the inventory database 204 (and/or the item database 402) are included in the taxonomy database 404, were the item records comprise some or all leaf categories in the taxonomy database 404.

In some embodiments, some taxonomy categories (such as leaf categories and applicable non-leaf categories) are associated with baseline shelf life information for the category. The baseline shelf life for a category can represent a number of days since purchase that the item would be still be available for use if properly stored. In some implementations, the baseline shelf life for some categories can represent an estimated time before the ingredient would expire or otherwise become unusable or an average time between purchase and consumption of the item. For example, a gallon of milk can be associated with a baseline shelf life of six days and a bunch of bananas with a baseline shelf life of four days. The baseline shelf life for an item may include an average rate at which the item is consumed (such as for imperishable items bought in bulk such as spices or flour), which can be used to estimate a remaining quantity of the item. Baseline shelf life information can be manually entered or imported into the taxonomy database 404 (for example, information on expiration or "best-by" dates) and/or can be calculated by the recommendation system 103 based on an analysis of the transaction records database 208. For example, the recommendation system 103 calculates an average time period between purchases of a given item or category of items and use the calculated average as the baseline shelf life if the average time period is less than the expiration time of the item/category.

Further, categories of the taxonomy database 404 may be associated with one or more tags indicating properties of the item, such as "targeted" and "staple" tags. In some implementations, a "targeted" tag indicates an item is likely to be purchased only when the customer 104 plans to consume that item. For example, large cuts of meat (such as steaks, roasts, or pork chops) are not normally purchased without a plan to cook them and can be associated with the "targeted" tag. In contrast, a "staple" tag indicates that a category/item is likely to be kept available at all times (and purchased infrequently and/or in bulk) as is the case with basic spices (such as salt and pepper), vegetable oil, flour, and the like.

The recipe database 406 stores information about a set of recipes the recommendation system 103 is able to recommend to customers 104. In some implementations, recipes stored in the recipe database 406 include a list of ingredients and one or more instructions for preparing the ingredients to make the recipe. The list of ingredients for a recipe may include a category identifier for each item in the list of ingredients as well as a quantity of the item needed for the recipe. In some embodiments, an ingredient for a recipe is associated with a leaf category of the taxonomy database 404 (for example, a recipe specifically calling for 2% milk) and/or one or more non-leaf category (for example, a recipe calling for "milk" in general). In some implementations, a recipe additionally includes other information about the recipe, such as a difficulty level of making the recipe, one or more types of the recipe (such as baking, cooking, vegetarian, dinner, brunch, or the like), or specialized equipment required to make the recipe (such as a pressure cooker or food dehydrator).

Recipes of the recipe database 406 may be gathered from any suitable source and may be periodically updated within the recommendation system 103. In some implementations, some or all recipes of the recipe database 406 additionally include a set of substitute ingredients possible for the recipe. Each substitute ingredient can be associated with one or more ingredients of the recipe that it can replace if the recipe ingredient is not available. In some implementations, one or more ingredients in a recipe may be tagged as "non-substitutable" if that ingredient cannot be substituted without substantially altering the recipe. Substitute ingredient information can be imported with the recipe or can be calculated by the substitution engine 410.

The customer pantry module 408 determines individual customer ingredient pools for customers 104. A customer ingredient pool, as used herein, models the ingredients that a specific customer 104 will have available to make a recommended recipe. A customer ingredient pool can contain a list of ingredients the specific customer 104 already owns (a customer pantry model) as well as, in some embodiments, one or more items contained in current or pending orders of the customer. For example, a customer ingredient pool for a customer 104 can include the contents of a virtual "shopping cart" for a current order in addition to the items in the inferred customer pantry model for that customer 104.

In some embodiments, items associated with a "targeted" flag (for example, an item whose category in the taxonomy database 404 has a targeted flag) are not assumed to be available in a user's history based on previous purchases (as targeted items are more likely to be quickly consumed after purchase or earmarked for a specific use). Alternatively, "targeted" items can be assigned a shelf life discount or other weighting which lowers the assumed shelf life for those items. "Targeted" items can still be included in a customer ingredient pool if, for example, the targeted item is included in a current order/cart of the customer 104.

A customer pantry model for a customer 104 includes a set of taxonomy categories and/or specific items of the taxonomy database 404 the customer 104 is predicted to have available. Customer pantry models may be unique to a specific customer 104 and separately generated or refined for each customer 104. In some implementations, a customer pantry model additionally includes an estimated quantity of the included items/categories. To calculate a customer pantry model, the customer pantry module 408 may use heuristics based on one or more previous orders by the customer 104 (for example, from records of orders stored in the transaction records database 208) and baseline shelf life information for the items included in those orders.

For example, to develop a customer pantry model for a customer 104 the customer pantry module 408 retrieves recent transaction records for the customer 104 (for example, transaction records from the last 90 days). For each item the customer 104 recently purchased, the customer pantry module 408 compares the date of purchase and the baseline shelf life for the item (as stored in the relevant entry of the taxonomy database 404) with the current date to determine if the customer 104 is likely to still have the item in their pantry. In some implementations, the customer pantry module 408 additionally calculates an estimated remaining quantity based for one or more items on an estimated rate of consumption for those items.

In some embodiments, the customer pantry module 408 additionally applies personal shelf life estimates for one or more items frequently purchased by the customer 104. Personal shelf life estimates for a customer 104 may be calculated based on historical transaction data and can be stored by the customer pantry module 408 in the recommendation system 103 or in the customer 104's entry in the customer database 214. Historical transaction data for the customer may be retrieved from the transaction records database 208 or an external source. To identify items/categories of items to generate a personal shelf life estimate for, the customer pantry module 408 may look for frequent purchases of items sharing the same leaf category (or specific other category sharing use as an ingredient). For example, frequent purchases of items within the "2% milk" or "milk" category are tracked but purchases of items within the "dairy" category is too broad to establish a single personal shelf life estimate.

In some implementations, the customer pantry module 408 calculates personal shelf life estimates for items/categories purchased more than a threshold amount of times within a given time period (for example, if purchased at least monthly for three months or if purchased at least 8 times in the last year). Based on the average purchase frequency and standard deviation, the customer pantry module 408 can calculate a personal shelf life for the customer 104. In some implementations, the higher the standard deviation of time between purchases, the more conservative the personal shelf life estimate for that item will be. In some implementations, the customer pantry module 408 detects and discounts outlier gaps (for example, gaps of larger than two standard deviations) between historical purchases. An outlier gap in an otherwise regular purchase history can indicate that the customer 104 purchased the item from an outside source for which transaction information is not available to the recommendation system 103.

The substitution engine 410 determines one or more substitute ingredients for a recipe, according to some embodiments. As used herein, a "substitute" is an item (or items) that can replace the one or more ingredients of a recipe and still allow the recipe to be successfully completed. For example, in some recipes whole milk can be substituted for cream and when baking, baking soda, and cream of tartar are used as a substitute for baking powder. The substitution engine 410 can use a set of heuristic rules and/or a machine learning model to determine substitutes for recipe ingredients based on the recipe and/or categories of the substituted ingredient in the taxonomy database 404. In some implementations, the substitution engine 410 takes into account characteristics of the recipe when determining substitute ingredients, for example a type of recipe (such as baking or cooking), if one or more ingredients are tagged as non-substitutable, the number of ingredients in the recipe, the quantity required of the ingredient, and the like. Substitutes may be generated for a recipe in advance (and stored with the recipe in the recipe database 406) or calculated on the fly as needed by the recipe recommendation module 412. In some embodiments, the substitution engine 410 also generates substitutes for a predicted customer pantry, for example, to facilitate matching between the customer pantry and recipe ingredients. In alternative embodiments, substitutes are calculated on a per-item basis and some or all substitute information is stored in the taxonomy database 404.

Figure 5:
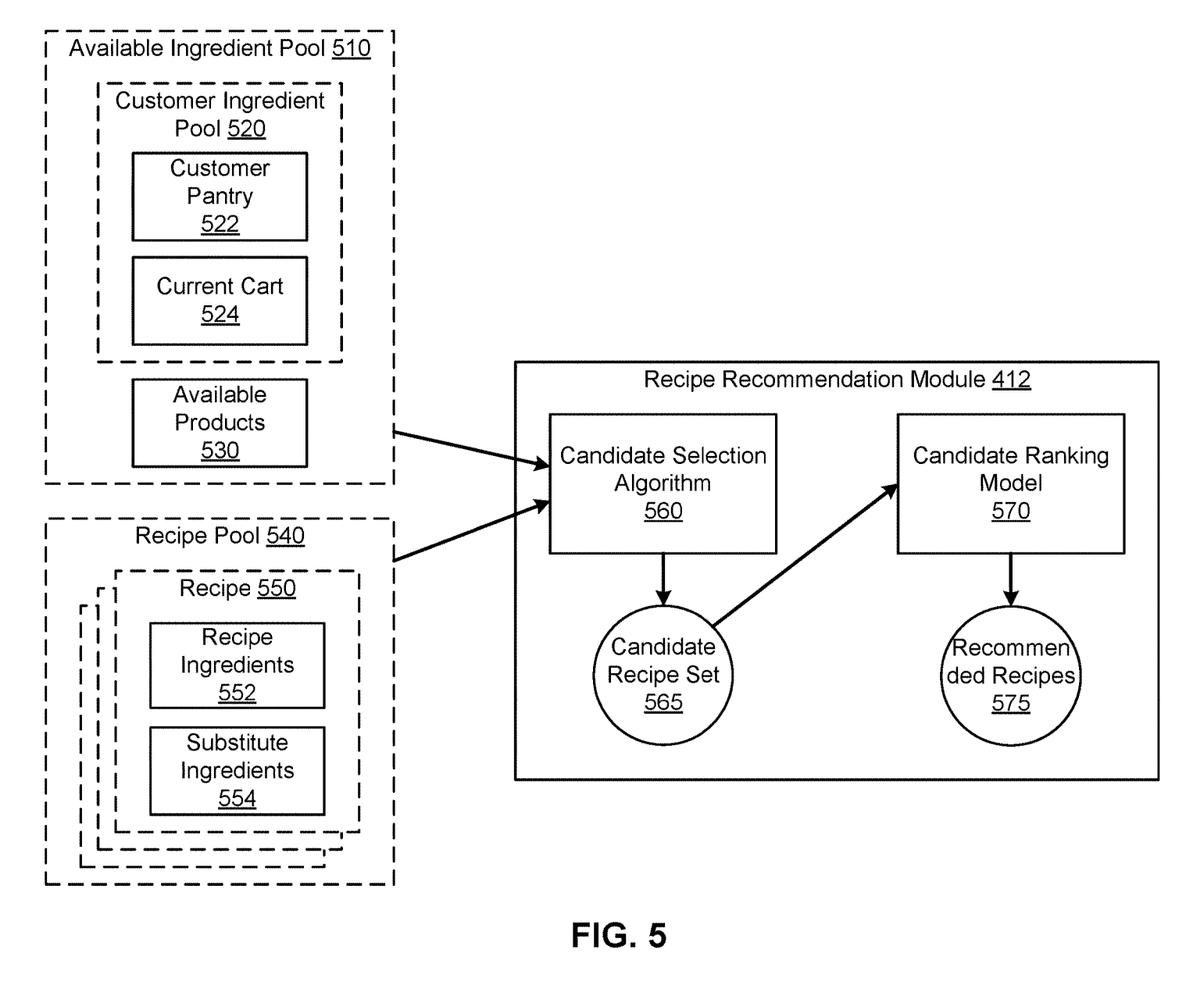
FIG. 5 illustrates a recipe recommendation module selecting recipes to recommend using a recommendation system, according to one embodiment.

In some embodiments, the recipe recommendation module 412 determines one or more recipes to recommend to a customer 104 based on an available ingredients and recipes drawn from the recipe database 406. In some embodiments, the recipe recommendation module 412 initially identifies a set of candidate recipes (herein, recipes meeting minimum criteria to be recommended to the customer 104) from the recipe database 406. The recipe recommendation module 412 then ranks the candidate recipes to select the top recipe recommendations for display to the customer 104. In some implementations, each candidate recipe in the set FIG. 5 illustrates a recipe recommendation module 412 selecting recipes to recommend using a recommendation system, according to one embodiment. FIG. 5 includes a recipe recommendation module 412 with a candidate selection algorithm 560 and a candidate ranking model 570. The recipe recommendation module 412 analyzes an available ingredient pool 510 (including a customer ingredient pool 520 and a set of available products 530) and a recipe pool 540 of recipes 550 (including recipe ingredients 552 and substitute ingredients 554) to determine recipe recommendations.

To determine recommended recipes, the recipe recommendation module 412 may first select a set of candidate recipes 565 using a candidate selection algorithm 560. To evaluate recipes 550, the candidate selection algorithm 560 may determine the overlap between the items in the available ingredient pool 510 and ingredients of recipes 550. The available ingredient pool 510 represents the set of items that are inferred to be available to the customer 104 (in some way) to make a recipe. In the embodiment of FIG. 5, the available ingredient pool 510 includes the customer ingredient pool 520 (representing the customer's owned ingredients, as estimated by the customer pantry module 408) and a set of available products 530 (representing items otherwise available to the customer, for example, through the online concierge system 102). As described above, the customer ingredient pool 520 includes an estimate of the customer pantry 522 as well as, in some embodiments, a current order of the customer 104. In some implementations, the set of available products 530 is determined by the recipe recommendation module 412 based on availability information from the inventory database 104 and characteristics of the customer 104 (such as a location or region of the customer). For example, an item may have limited regional distribution, may only be seasonally available in certain areas, or can be out of stock or hard to find due to increased demand.

In some embodiments, the recipe pool 540 includes recipes 550 from the recipe database 406 which the customer 104 may be recommended. In some implementations, the recipe recommendation module 412 selects all recipes from the recipe database 406 for the recipe pool 540 alternatively, the recipe recommendation module 412 can filter recipes 550 or otherwise limit the number of recipes in the recipe pool 540. For example, recipes are filtered from the recipe pool 540 based on preferences selected by the customer 104 (for example, if a customer selects that they only cook and do not bake), a difficulty level of the recipe, seasonality, or other qualities of the recipe and/or customer 104. Each recipe 550 in the recipe pool 540 includes a set of ingredients 552 used to prepare the recipe and another set of substitute ingredients 554, which can be used in place of one or more ingredients from the set of recipe ingredients 552 as described above, and each substitute ingredient may be associated with the recipe ingredient for which it can be substituted.

The candidate selection algorithm 560 selects a set of candidate recipes 565 from the recipe pool 540. In some embodiments, candidate recipes are selected based on the calculation of a weighted overlap between items of the available ingredient pool 510 and each recipe 550 of the recipe pool 540. To compute the overlap for a recipe 550, the candidate selection algorithm 560 compares recipe ingredients 542 and substitute ingredients 552 for recipes 550 with available items of the available ingredient pool 510 of the customer 104 and determines the overlap based on a set of matching ingredients common to both pools, according to some embodiments. If the overlap for a recipe 550 meets certain conditions, the recipe 550 is added to the candidate recipe set 565 for further analysis.

The candidate selection algorithm 560 may then determine an overlap between the recipe 550 and the customer ingredient pool 520 to determine a set of missing ingredients the customer 104 needs to make the recipe. As used herein, a "missing ingredient" is an ingredient of the set of recipe ingredients 552 that the customer 104 would have to acquire before making the recipe 550, for example ingredients for which no item exists in the customer ingredient pool 520 that matches it (or any corresponding substitutes 554). An "overlap" between a recipe 550 and a customer ingredient pool 510 represents, as used herein, the extent to which the recipe ingredients 552 (or their substitutes 554) match ingredients already present in the customer ingredient pool 520. An overlap can include an overlap percentage (based on the number of matching ingredients and the total number of recipe ingredients 552), a set of matching ingredients (from the recipe ingredients 552), and/or a set (or number) of missing ingredients not included in the customer ingredient pool 520.

In some implementations, the candidate selection algorithm 560 weights individual recipe ingredients 552 when calculating the overlap. For example, matched substitute ingredients 554 are discounted relative to matched recipe ingredients 552 such that a recipe 550 with many matching substitutes has less overlap (for example less overlap percentage or more missing ingredients) than if the recipe had matched recipe ingredients instead of the substitutes. In some embodiments, a substitute can count for half of a recipe ingredient for calculating overlap. Similarly, ingredients marked as "staples" (such as salt or cooking oil) can be weighted less to account for their ubiquity and ease of accessibility. Ingredients may be weighted in overlap calculations based on a category of the item in the taxonomy database 406 (for example, meats or proteins can have an increased weighting), a cost of the item, information from the recipe (such as a relative quantity required or the title of the recipe), or other sources. In some implementations, ingredients matched to the current cart 524 are weighted higher than ingredients matched to the customer pantry 522.

In some implementations, the recipe recommendation module 412 determines matches between items of the customer ingredient pool 520 and ingredients of a recipe 550 based on the taxonomy database 404 categories of the available item and the recipe ingredient (for example, matching the category of the recipe ingredient with available items associated with the same category or a leaf category of the ingredient's category). Similarly, implementations match recipe ingredients and available items using other methods, such as using a string-matching algorithm to match the name of the recipe ingredient with the name of available items (or their corresponding taxonomy categories from the taxonomy database 404). In some embodiments, the candidate selection algorithm 560 prioritizes matches of recipe ingredients 552 over substitute ingredients 554, for example by first matching recipe ingredients 552 for a recipe and, if no match is found for a specific recipe ingredient 552, checking any corresponding substitute ingredients 554 to see if a substitute can be found for the missing recipe ingredient 552.

Based on the overlap (or weighted overlap) between each recipe 550 and the customer ingredient pool 520, the candidate selection algorithm 560 selects candidate recipes from the recipe pool 540. In some implementations, candidate recipes 550 are selected based on one or more heuristic rules. For example, recipes 550 are selected for the candidate recipe set 565 based on a target overlap percentage and/or a threshold number of missing ingredients. In some implementations, the heuristic rules used to evaluate recipes and the evaluation thresholds are tiered based on characteristics of the individual recipe 550. For example, recipes 550 with a low number of recipe ingredients 552 (such as below 10) are evaluated based on a threshold number of missing ingredients to determine inclusion in the candidate recipe set 565 (as overlap percentage can be less useful measure when only small numbers of ingredients are involved). In the same implementation, recipes with more ingredients are evaluated based on a different threshold numbers of missing ingredients and/or based on overlap percentage. In some embodiments, candidate recipes 550 are ranked based on overlap percentage, number of missing ingredients, or other score based on the calculated overlap for the recipe 550 and the candidate recipe set 565 is selected based on the ranking (for example, the first n candidates in the ranking or the top x % of candidate recipes 550 can be selected).

In some implementations, the candidate selection algorithm 560 uses different sets of the heuristic rules to evaluate recipes 550 depending on the situation the recipe recommendation will be presented in. For example, the heuristic rules may be relatively conservative for recipe recommendations intended for a main page or after the customer 104 has completed a purchase, selecting recipes with less (or no) missing ingredients and relatively high overlap. In contrast, the heuristic rules may be more permissive when the recipe recommendation is to appear while the customer 104 is browsing available ingredients or on a dedicated recipe recommendation page, allowing or preferring recipes with relatively more missing ingredients. Conservative recommendations on a main page or purchase confirmation can aid the customer 104 in preparing recipes with only ingredients they already have, while more permissive recommendations while a customer 104 is browsing for new items or specifically looking for new recipes can encourage the customer 104 to use new or different ingredients (and provide a wider range of recipe recommendations).

In some implementations, the candidate selection algorithm 560 also calculates an overlap between the available ingredient pool 510 and each recipe 550 to determine if it is possible to make the recipe 550 using currently available ingredients. In some implementations, the candidate selection algorithm 560 selects only recipes 550 for which all recipe ingredients 552 can be found in the available ingredient pool 510 for the candidate recipe set 565. Otherwise, it may be impossible for the customer 104 to easily source all ingredients to prepare the recipe 550 using the online concierge system 102 or other methods.

In some embodiments, the recipe recommendation module 412 uses one or more candidate ranking models 570 to analyze the candidate recipe set 565 and determine a final set of recommended recipes 575 for display to the customer 104. A candidate ranking model 570 may include a machine learning model trained to determine a score for a candidate recipe, which can be used to evaluate and rank the candidate recipes (based on the scores for each candidate recipe). In some implementations, the recipe recommendation module 412 selects from multiple candidate ranking models 570, each trained to score a candidate recipe based on different factors and/or towards a different goal. Candidate ranking models 570 may be selected based on the goals of the online concierge system 102 and/or based on the context in which the recipe recommendation will appear. For example implementations may include, candidate ranking models 570 trained to optimize the conversion rate of customers 104 (preferring recipes 550 that cause customers 104 to purchase missing items or to complete a purchase), the number of return customers (preferring recipes 550 that cause customers 104 to return to make additional purchases or view more recipes), customer experience (such as, based on satisfaction survey results), or other similar factors.

Candidate ranking models 570 are machine learning models which may be trained using any machine learning technique. Machine learning techniques for implementing a candidate ranking model 570 may be selected based on the implementation, available input features or training data, and/or a desired output of the candidate ranking model 570. For example, a candidate ranking model 570 may be trained using machine learning techniques and/or algorithms such as neural networks, linear regressions, classifiers, gradient boosting algorithms, and deep learning techniques.

Candidate ranking models 570 determine a score for an input candidate recipe based on a set of input features which may include customer features drawn from a customer profile of the customer 104 (for example, from the customer database 214), historical purchase features including information about the past purchases of the customer 104 or one or more items associated with the recipe 550, item specific features of one or more items of the recipe 550 (such as a cost or current availability of one or more items), or other suitable features (such as a current date or time. For example, a candidate ranking model 570 may take input features including a recipe 550 (including the list of recipe ingredients 552 and the instructions for preparing the ingredients), the set of missing ingredients, a number of substitute ingredients 554 being used in the matched recipe, an overlap percentage for the recipe 550, the current cart 524 of the customer 104, alongside other characteristics of the customer 104, available ingredient pool 510, or recipe pool. Based on the set of input features, the candidate ranking model 570 outputs a score for the candidate recipe, which may represent a probability of a certain action occurring if the candidate recipe is recommended (such as the customer 104 adding recommended missing ingredients to a current purchase or the customer returning to the online concierge service 102 for future recommendations) or an expected value of recommending the candidate recipe to the customer 104 (such as monetary value of likely additional purchases or another expected value calculated using a different metric like customer satisfaction). In some embodiments, a candidate ranking model 570 further processes the output of the machine learning model to determine a final score, such as by multiplying the probability of a customer 104 purchasing a missing item with the cost of the missing item.

In some implementations, candidate ranking models 570 are trained using a set of training data including a number of historical examples, each example having data for the input features and a label corresponding to the (desired) output of the model for those input features. The labels used for the training data correspond to what output of the model should be, for example, if the model is to output a probability of an event, then training data labels are either 0 or 1 depending on whether the event occurred in that training example and if the model is to output a dollar spend prediction, then the labels are the amount spent for each example data point. In some embodiments, candidate ranking models are trained based on training data assembled and/or labeled using customer conversion data (such as data listing customer 104 purchases of missing items after recipe recommendations), customer activity data collected before and/or after a recipe recommendation was presented to the customer, and/or customer satisfaction surveys (for example, about recommended recipes). Once trained, the candidate ranking model 570 can be applied to the input features for a candidate recipe to predict the score for that candidate recipe (such as the likelihood of the customer 104 purchasing one or more missing ingredients).

After the candidate recipes are ranked based on a candidate ranking model 570 the recipe recommendation module 412 may apply final filtering rules (for example, by applying a discount or penalty to recipes 550 recently recommended to the customer 104) and selects the top candidate recipes for inclusion in the set of recommended recipes 575. In some implementations, the number of recipes 550 in the set of recommended recipes 575 depends on the context in which the recommendations will be displayed. For example, for UIs in which recommendations will appear as a secondary element (such as while a user is browsing for items), the set of recommended recipes 575 may contain relatively few recipes (such as one or two recipes). In contrast, some implementations include dedicated recipe recommendation pages which may display five or more recommended recipes 575 at once.

As described above, the user interface engine 216 generates user interfaces and/or content for display in user interfaces of the CMA 106, including user interfaces featuring recommendations generated by the recommendation module 103. The user interface module 416 may generate user interfaces and/or user interface content for display on a customer's 104 client device (for example, via the customer interface 302). Similarly, the user interface module 416 may receive indications of customer 104 interactions with interactive elements in the generated interfaces and update the user interfaces with new content, switch user interfaces, or otherwise handle customer 104 input in response. For example, a customer 104 may interact with a user interface element to add one or more items to an order (such as suggested missing items), receive more information about recommended recipes 575 (such as step-by-step instructions), request recommended recipes, or the like.

In some implementations, the user interface module 416 receives one or more recommendations from the recommendation system 103 for a customer 104 and inserts the recommendations into one or more user interfaces for the customer 104. For example, the user interface module 416 generates a user interface allowing a customer 104 to browse through items for inclusion in an order on the CMA 106. The user interface module 416 may insert information about one or more recommended recipes 575 into appropriate user interfaces. For example, a user interface can include the name of one or more recommended recipes 575 and a list of missing items for each recommended recipe, as received from the recommendation system 103. In some implementations, the user interface module 416 requests recipe recommendations for a customer 104 from the recommendation system 103, prompting the recommendation system 103 to identify and provide recommended recipes 575 to the user interface module 416 for inclusion in a user interface.

Figure 6:
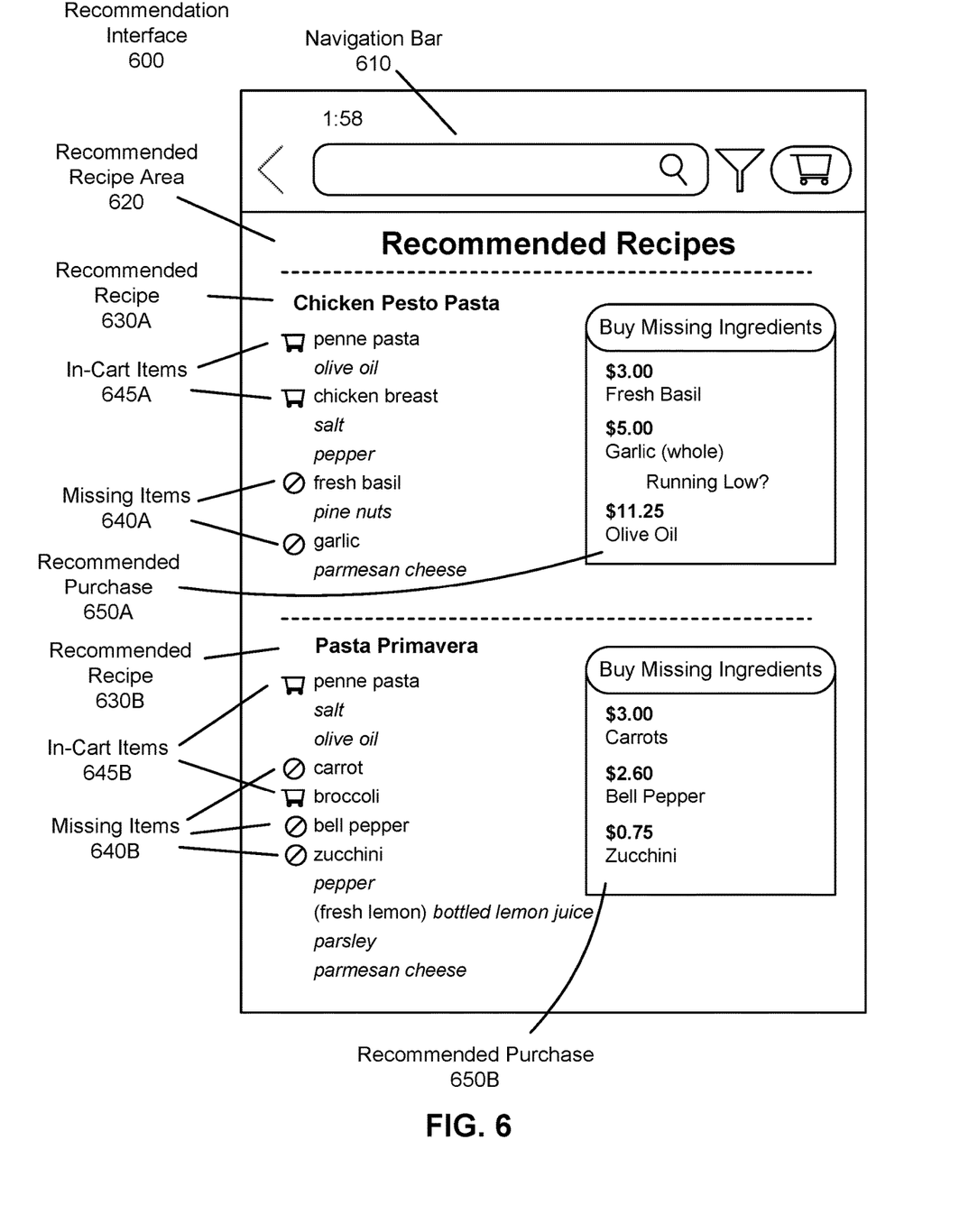
FIG. 6 illustrates an example user interface displaying recommended recipes to a customer, according to one embodiment.

FIG. 6 illustrates an example user interface displaying recommended recipes to a customer, according to one embodiment. The recommendation interface 600 of FIG. 6 includes a navigation bar 610, a recommended recipe area 620, and recommended recipes 630A and 630B each including indications of missing items 640 and in-cart items 645 and a recommended purchase 650. The recommendation interface 600 allows a customer 104 to view information about recommended recipes 630 generated by the recommendation system 103. In some implementations, the navigation bar 610 allows the customer 104 to navigate to other user interfaces, search for ingredients or other items, view their current cart (or other pending orders) or the like.

The recommended recipe area 620 may contain information about recommended recipes 630 provided by the recommendation system 103. In this example, the recommended recipe area 620 includes two recommended recipes (the recommended recipes 630A and 630B), but other implementations of a recommended recipe area 620 include different numbers of recommended recipes 630 depending on the context. Similarly, the content of the recommendation interface 600 of FIG. 6 is primarily made of the recommended recipe area 620, but other user interfaces generated by the user interface module 416 may include information about recommended recipes 630 overlaid on or integrated within other user interface content (as further discussed in relation to FIG. 7).

Each recommended recipe 630 can include information about the recipe, for example, a title, image of the completed recipe, list of ingredients, and/or instructions for preparing the recipe. For example, the recommended recipe 630A (for chicken pesto pasta) includes an ingredient list including entries for penne pasta, chicken breast, parmesan cheese, and so on. In some implementations, each entry in the ingredient list of a recommended recipe 630 includes a status indicator, which can inform the customer 104 about the status of that ingredient. For example, status indicators can be included for missing items 640, in-cart items 645, items included in the customer pantry 522 for the customer, unavailable items, and/or substituted ingredients. The recommendation interface 600 can present status indicators in the form of icons, text style changes (such as changes to font, text color, or text size), informational text (such as a label reading "missing" on a missing ingredient), and/or inclusion of ingredients into a group or section (for example, a "missing ingredients" section).

For example, the penne pasta and chicken breast ingredients of the recommended recipe 630A are in-cart items 645A currently present in the customer's cart and are denoted in the recommendation interface 600 by a shopping cart icon. Similarly, the customer 104 is likely missing the fresh basil and garlic needed to make the recommended recipe 630A, so those missing items 640A are marked by a no symbol. The recommendation interface 600 also uses text style as a status indicator, listing ingredients in the customer pantry 522 for the customer 104 in italics. In some implementations, the recommendation interface 600 include further information about ingredients the customer 104 is inferred to have on hand, such as a "last purchase" date or an estimated remaining quantity of the item (as determined by the customer pantry module 408). In some implementations, substituted ingredients (ingredients replaced by a substitute ingredient determined by the substitution engine 510) are labeled and both the original ingredient and suggested substitute ingredient are identified. For example, in the pasta primavera recommended recipe 630B the fresh lemon ingredient (indicated in parenthesis) has been substituted for bottled lemon juice.

In some implementations, each recommended recipe 630 includes a recommended purchase 650 for the customer 104. A recommended purchase 650 may include the missing items 640 needed for the customer 104 to prepare the recommended recipe 630. For example, the recommended purchase 650B for the recommended recipe 630B includes listings for the missing items 640B (carrots, bell pepper, and zucchini) with corresponding items. In some implementations, interacting with the recommended purchase 650B adds the missing items 640B to the customer's cart (or navigate to a different user interface where the customer 104 can purchase the missing ingredients). The recommended purchase 650A for the recommended recipe 630A also includes the missing items 640A, but additionally includes an additional item (olive oil). In some implementations, the recommended purchase 650A also includes staple items the customer 104 is inferred to be low in quantity of, staple items used in the recipe, or other items relevant to the customer 104.

Figure 7:
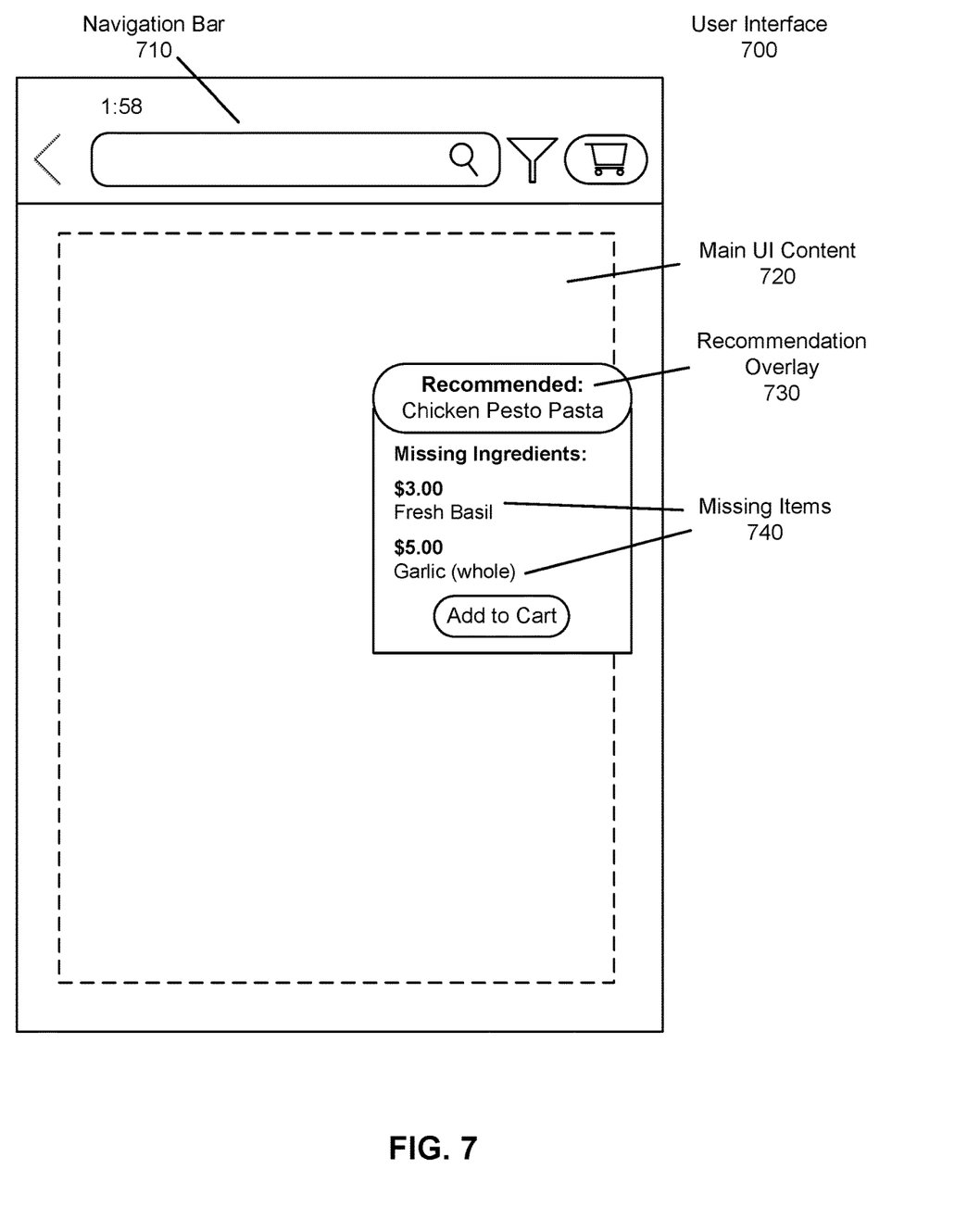
FIG. 7 illustrates an example user interface displaying recommendations in the context of other user interface content, according to one embodiment.

As described above, user interfaces generated by the user interface module 416 may include information about recommended recipes 630 overlaid on or integrated within other user interface content. FIG. 7 illustrates an example user interface displaying recommendations in the context of other user interface content, according to one embodiment. The user interface 700 of FIG. 7 includes a navigation bar 710, a main UI content 720, and a recommendation overlay 630 for a recommended recipe. As in the recommendation interface 600, the navigation bar 710 allows the customer 104 to navigate to other user interfaces of the CMA 106 (such as the recommendation interface 600), search for ingredients or other items, view their current cart (or pending orders), or the like.

In some implementations, the main UI content 720 takes up most space within the user interface 700 and includes content not directly related to recipe recommendations. For example, the main UI content 720 includes the current contents of the user's cart, a list of items (for example, based on a customer 104 query) for the customer 104 to browse through, a main page for the customer 104, or the like. Within or overlaid on the main UI content 720 is the recommendation overlay 730, which provides information about a recommended recipe. In some implementations, the recommendation overlay 730 provides only essential information about the recommended recipe, for example, the title of the recipe and a list of missing items 740 needed to make the recipe. User interaction with the recommendation overlay 730 adds the missing items to an order (for example, through interaction with the "add to cart" button) to provide the customer 104 with more information about the recommended recipe. For example, customers 104 may be directed to the recommendation interface 600 for more information about a recommended recipe displayed in the recommendation overlay 630.

Figure 8:
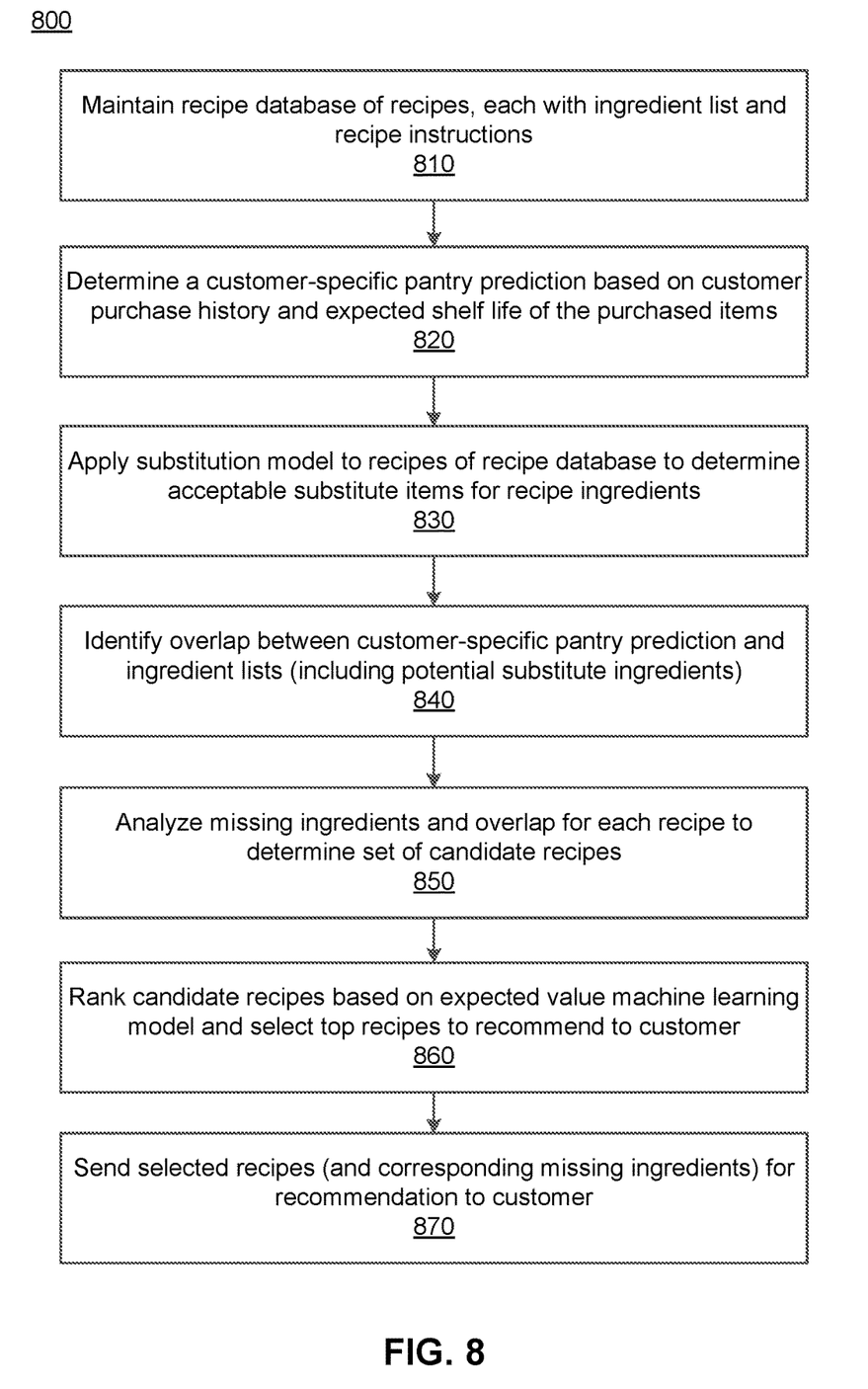
FIG. 8 is a flowchart illustrating a process for selecting recipes for recommendation to a customer, according to one embodiment.

FIG. 8 is a flowchart illustrating a process for selecting recipes for recommendation to a customer, according to one embodiment. The process 800 begins with a recommendation system maintaining 810 a recipe database of recipes each with an ingredient list and recipe instructions for making the recipe. Then the recommendation system determines 820 a customer-specific pantry prediction (for example, containing a set of items the customer is predicted to have on hand) for a customer based on that customer's purchase history and an expected shelf life of the purchased items. The recommendation system additionally determines a set of substitute items for recipe ingredients of one or more recipes by applying 830 a substitution model to recipes of the recipe database. To determine the recommendations, the recommendation system identifies 840 an overlap between the customer-specific pantry prediction and the ingredient lists (including potential substitutes) of each of a set of recipes. The recommendation system can then analyze 850 the missing ingredients and the level of overlap between the pantry prediction and the ingredient list for each recipe to select a set of candidate recipes for potential recommendation. The recommendation system then ranks 860 the candidate recipes based an expected value (as calculated by a machine learning model) and selects high ranked recipes for recommendation to the customer. Finally, the recommendation system can send 870 the selected recipes to be recommended to the customer (for example, via a recommendation user interface).

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for recommending recipes to a user, the method comprising:
    maintaining, at a recipe recommendation system, a recipe database comprising a plurality of recipes, each recipe including an ingredients list comprising a set of items required to prepare the recipe;
    determining, based on a purchase history of the user and an expected shelf life of one or more items in the purchase history, a user pantry model, the user pantry model comprising a set of items inferred to be available to the user;
    determining, from the plurality of recipes, a set of candidate recipes by, for each of the plurality of recipes:
        identifying, based on a comparison of the ingredients list for the recipe with the user pantry model, a set of missing ingredients comprising one or more items in the ingredients list not included in the user pantry model, and
        selecting the recipe as a candidate recipe based on the set of missing ingredients;
    scoring each of the set of candidate recipes by applying a machine learning model to the candidate recipe, where the machine learning model is trained to generate a score of recommending the candidate recipe to the user, wherein the score indicates a probability of one or more user actions occurring if the candidate recipe is recommended, the one or more actions comprising adding a missing ingredient of the candidate recipe to a current purchase order;
    selecting, based on the scored candidate recipes, one or more candidate recipes to recommend to the user; and
    sending, from the recipe recommendation system to a user device associated with the user, the one or more selected candidate recipes for display to the user.

2. The method of claim 1, wherein determining the user pantry model for the user comprises:
    identifying a set of recently purchased items from the purchase history of the user; and
    selecting one or more items of the set of recently purchased items for inclusion in the user pantry model based on a historical purchase frequency of the item in the purchase history of the user.

3. The method of claim 1, wherein determining the user pantry model for the user is based on one or more tags associated with items in the purchase history.

4. The method of claim 1, further comprising:
    receiving, from a user device associated with the user, a request for a graphical user interface comprising recommended recipes; and
    wherein sending the one or more selected candidate recipes for display to the user comprises generating the graphical user interface comprising recommended recipes based on the one or more selected candidate recipes.

5. The method of claim 4, wherein the generated graphical user interface comprising recommended recipes includes an identification of one or more missing ingredients for each of the selected candidate recipes.

6. The method of claim 1, wherein the set of missing ingredients comprises one or more items in the ingredients list not included in either the user pantry model or a current order of the user.

7. The method of claim 1, wherein the analysis of the set of missing ingredients is based on a number of missing ingredients in the set of missing ingredients, a total number of ingredients in the ingredients list of the recipe, and one or more weights of ingredients of the ingredients list.

8. The method of claim 1, wherein the ingredients list of each recipe further comprises a set of substitute ingredients that could replace one or more ingredients when preparing the recipe.

9. The method of claim 8, further comprising:
determining, for each of the plurality of recipes, a set of substitute ingredients that could replace one or more ingredients of the ingredients list when preparing the recipe; and
including the set of substitute ingredients in the ingredients list for the recipe.

10. The method of claim 1, wherein the machine learning model is trained to predict a likelihood that the user would take an action in response to a recommendation of a recipe.

11. A non-transitory computer readable storage medium comprising instructions which, when executed by a processor, cause the processor to perform the steps of:
maintaining, at a recipe recommendation system, a recipe database comprising a plurality of recipes, each recipe including an ingredients list comprising a set of items required to prepare the recipe;
determining, based on a purchase history of a user and an expected shelf life of one or more items in the purchase history, a user pantry model, the user pantry model comprising a set of items inferred to be available to the user;
determining, from the plurality of recipes, a set of candidate recipes by, for each of the plurality of recipes:
identifying, based on a comparison of the ingredients list for the recipe with the user pantry model, a set of missing ingredients comprising one or more items in the ingredients list not included in the user pantry model, and
selecting the recipe as a candidate recipe based on the set of missing ingredients;
scoring each of the set of candidate recipes by applying a machine learning model to the candidate recipe, where the machine learning model is trained to generate a score of recommending the candidate recipe to the user, wherein the score indicates a probability of one or more user actions occurring if the candidate recipe is recommended, the one or more actions comprising adding a missing ingredient of the candidate recipe to a current purchase order;
selecting, based on the scored candidate recipes, one or more candidate recipes to recommend to the user; and
sending, from the recipe recommendation system to a user device associated with the user, the one or more selected candidate recipes for display to the user.

12. The computer readable storage medium of claim 11, wherein determining the user pantry model for the user comprises:
identifying a set of recently purchased items from the purchase history of the user; and
selecting one or more items of the set of recently purchased items for inclusion in the user pantry model based on a historical purchase frequency of the item in the purchase history of the user.

13. The computer readable storage medium of claim 11, wherein determining the user pantry model for the user is based on one or more tags associated with items in the purchase history.

14. The computer readable storage medium of claim 11, wherein the instructions, when executed by the processor, further cause the processor to perform the steps of:
receiving, from a user device associated with the user, a request for a graphical user interface comprising recommended recipes; and
wherein sending the one or more selected candidate recipes for display to the user comprises generating the graphical user interface comprising recommended recipes based on the one or more selected candidate recipes.

15. The computer readable storage medium of claim 14, wherein the generated graphical user interface comprising recommended recipes includes an identification of one or more missing ingredients for each of the selected candidate recipes.

16. The computer readable storage medium of claim 11, wherein the set of missing ingredients comprises one or more items in the ingredients list not included in either the user pantry model or a current order of the user.

17. The computer readable storage medium of claim 11, wherein the analysis of the set of missing ingredients is based on a number of missing ingredients in the set of missing ingredients, a total number of ingredients in the ingredients list of the recipe, and one or more weights of ingredients of the ingredients list.

18. The computer readable storage medium of claim 11, wherein the ingredients list of each recipe further comprises a set of substitute ingredients that could replace one or more ingredients when preparing the recipe.

19. The computer readable storage medium of claim 18, wherein the instructions, when executed by the processor, further cause the processor to perform the steps of:
determining, for each of the plurality of recipes, a set of substitute ingredients that could replace one or more ingredients of the ingredients list when preparing the recipe; and
including the set of substitute ingredients in the ingredients list for the recipe.

20. The computer readable storage medium of claim 11, wherein the machine learning model is trained to predict a likelihood that the user would take an action in response to a recommendation of a recipe.

* * * * *